W. DEWEY.
AUTOMATIC PUMP FOR MOTOR VEHICLES.
APPLICATION FILED MAR. 13, 1917.
1,287,912.
Patented Dec. 17, 1918.
2 SHEETS—SHEET 1.
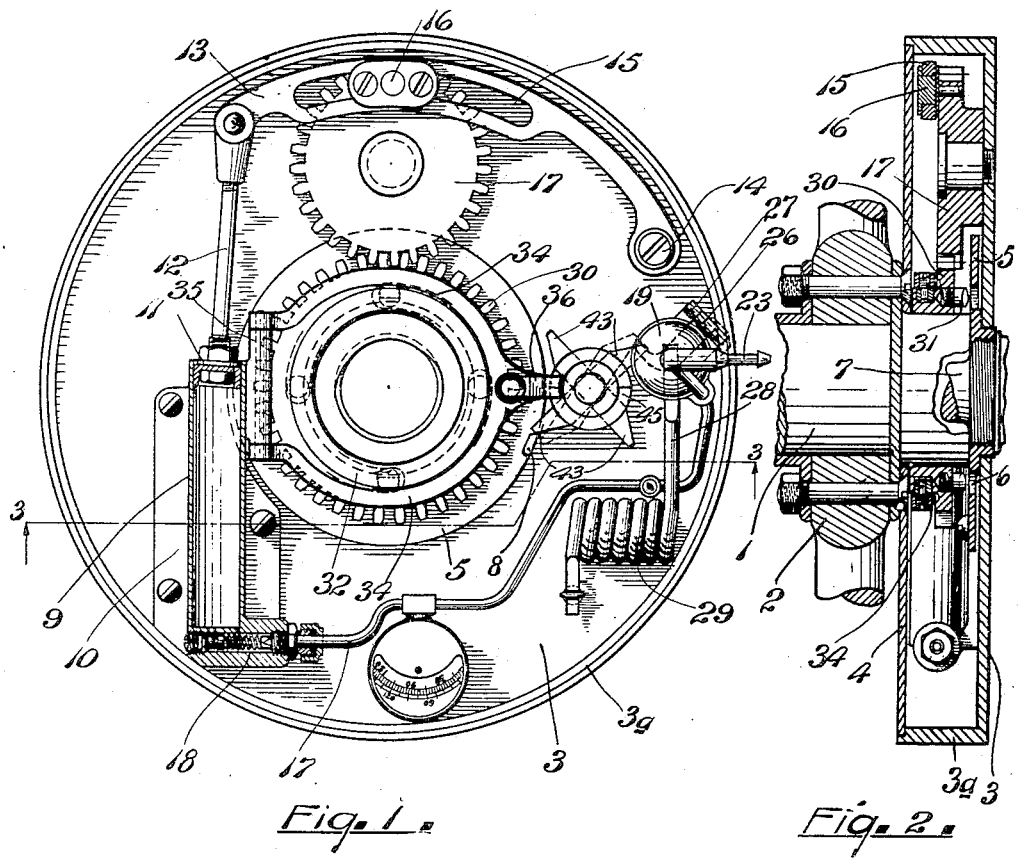
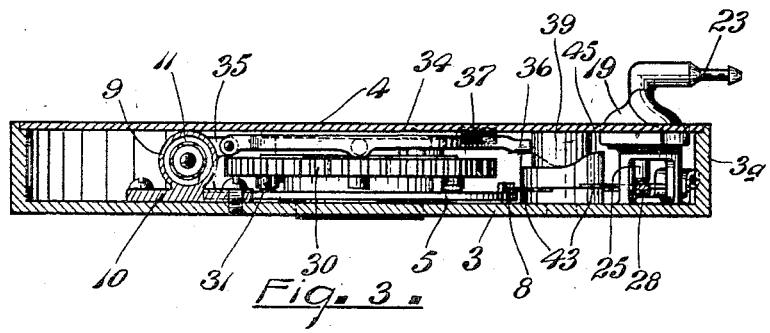
Inventor
Walter Dewey
By Moulton & Lawrence
Attorneys.

W. DEWEY.
AUTOMATIC PUMP FOR MOTOR VEHICLES.
APPLICATION FILED MAR. 13, 1917.

1,287,912.

Patented Dec. 17, 1918.
2 SHEETS—SHEET 2.

Inventor
Walter Dewey
By Moulton & Lawrence
Attorneys.

UNITED STATES PATENT OFFICE.

WALTER DEWEY, OF BELLAIRE, MICHIGAN.

AUTOMATIC PUMP FOR MOTOR-VEHICLES.

1,287,912.  Specification of Letters Patent.  Patented Dec. 17, 1918.

Application filed March 13, 1917. Serial No. 154,435.

*To all whom it may concern:*

Be it known that I, WALTER DEWEY, a citizen of the United States of America, residing at Bellaire, in the county of Antrim and State of Michigan, have invented certain new and useful Improvements in Automatic Pumps for Motor-Vehicles; and I do hereby declare the following to be a full, clear, and exact description of the invention, such as will enable others skilled in the art to which it appertains to make and use the same.

This invention relates to a pump for automobile tires adapted for attachment to an automobile wheel and having for its primary object and purpose the provision of mechanism which becomes automatically operable when the pressure in the tire has reduced below a certain predetermined amount and likewise becomes automatically inoperative when the pressure in the tire has reached a certain higher predetermined amount.

The mechanism by which this result is attained is illustrated in the accompanying drawings in which:

Figure 1 is a side elevation of the same.

Fig. 2 is a vertical section therethrough.

Fig. 3 is a section taken substantially on line 3—3 of Fig. 1.

Figure 5:
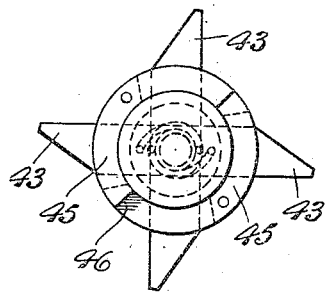
Fig. 5 is a plan view, Fig. 6 a side elevation
Figure 6:
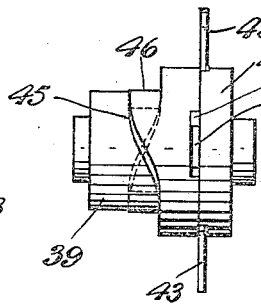
Figure 4:
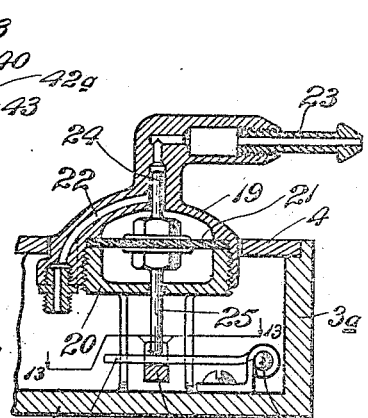
Fig. 4 is an enlarged section taken through the diaphragm mechanism of the device.
Figure 7:
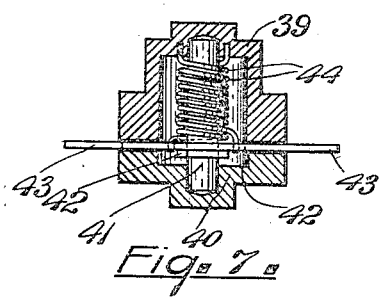
Fig. 7 is a vertical section of a detail of structure through which the automatic operation of the mechanism is attained.
Figure 11:
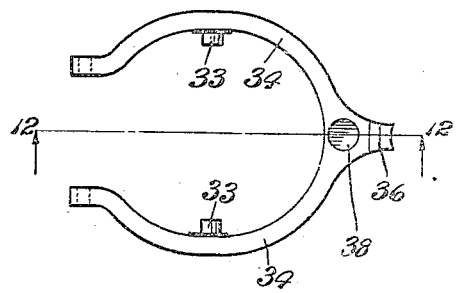
Figure 8:
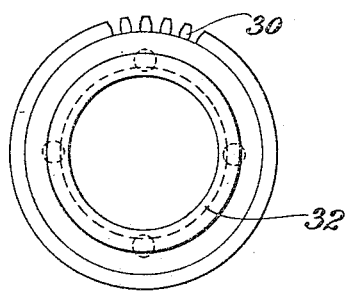
Fig. 8 is a plan view, Fig. 9 a side elevation and Fig. 10 a fragmentary under plan view of the movable gear and clutch element which is automatically rendered operative and inoperative with the reduction and increase of pressure.
Figure 12:
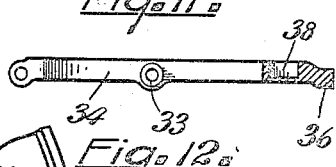

Fig. 11 is a plan view and Fig. 12 is a section on the line 12—12 of Fig. 11, illustrating the yoke element for operating said gear shown in Figs. 8, 9 and 10, and Fig. 13 is a sectional plan taken on the line 13—13 on Fig. 4.

Like reference characters refer to like parts throughout the several views of the drawings.

The device as a whole is adapted to be mounted upon an automobile wheel the hub of which is indicated at 1, the wheel 2 being secured thereto in any approved manner. Attached to said wheel is a shallow dish-like member having a base 3 and sides 3ª the open side thereof being normally covered by a plate 4. Located alongside the base 3 is a disk 5 having a plurality of openings 6, the disk being permanently and immovably secured to the end of the axle 7 on which the wheel is mounted. Adjacent one edge of the disk 6 a lip 8 is turned laterally as shown best in Fig. 13.

A pump barrel 9 is secured by means of a bracket 10 cast integral therewith to the inner face of the base 3 and a valveless piston 11 is mounted within the barrel said piston being secured at the end of a rod 12 which at its opposite end is pivotally connected to a curved link 13 which is pivotally mounted at 14 on said base 3. Between its ends link 13 is enlarged and has a curved slot 15 cut therein through which a pin 16 carried adjacent one edge of a pinion 17 projects and is permanently secured, it being apparent that the rotation of pinion 17 reciprocates the rod 12 and the piston carried thereon, thereby forcing air out of the barrel. The air forced from the barrel is carried away through the small pipe 17 between which and the base a check valve 18 is located to guard against return of the air to the barrel. The air passing through the pipe 17 is led to a housing comprised of upper and lower members 19 and 20 between which a diaphragm 21, preferably of rubber, is placed the air entering above the diaphragm through a passage 22 formed in the upper member 19 as shown in Fig. 4. The air leaves said member 19 through a nipple 23 this nipple being adapted to have a suitable connection between it and the valve of an automobile tire to pass the air thereto.

The diaphragm 21 provides an air tight connection so that any air entered above it cannot escape except through the part 23. The diaphragm under pressure is adapted to move and is guided in its movements by a pin 24 which enters into an opening formed in the housing member 19. On the opposite side of the diaphragm a pin 25 projects through the other member 20 and seats against an irregularly shaped member 26 which is pivotally mounted at one end as indicated at 27, its opposite end being free and provided with a lateral extension 26ª. One end 28 of a strong coil spring 29 passes under the member 26 and has a tendency to move the same, working against the air pressure on the diaphragm 21. Spring 29 is secured permanently in any suitable manner to the base 3.

A gear 30 is loosely mounted around the hub 7 within the member 3 and meshes with the pinion 17 heretofore described. From one side of this gear a plurality of pins 31 project and in one position of the gear are adapted to enter the openings 6 in the disk 5. On the opposite side a collar 32 is formed integral with the gear in which seat projections 33 formed on the inner sides of arms 34 of a yoke which practically surrounds the collar the ends of the arms being pivotally connected to a bracket 35 formed integral, preferably, with the pump barrel 9. Directly opposite the point of pivotal connection a lug 36 projects from the yoke. A spring 37 is seated in a seat 38 formed in one side of the yoke and is under compression between the yoke and side 4, the tendency of the spring being to force pin 31 into the openings 6 of the disk 5.

Between the disk and the housing for the diaphragm a rotary member is provided which consists of two parts 39 and 40 the ends of which are rotatively mounted in the base 3 and cover 4 respectively. The member is hollow and a pin 41 is seated within pivotally mounted on which are two flat bars 42 one over the other which extend outwardly beyond the sides of the member through slots 42$^a$ which are wider than the bars which are formed with ends 43 having one side cut at an angle as shown. Coil springs 44 around the pinion 41 connect with said bars and tend to hold them normally in the full line position shown in Fig. 1. Part 39 of this member is formed with irregular outlines making two cams 45 with an abrupt shoulder 46 at the ends of the cams, said cams being located substantially over the upper bar 42 and at their greatest rise a little to one side of said bar.

Figures 9, 13:
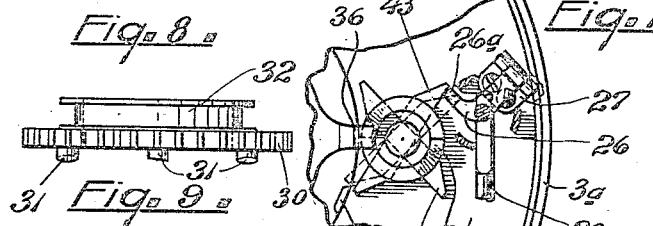
Figure 10:

When the air pressure is sufficiently high or has reached a certain desired and predetermined amount diaphragm 21 is moved against the spring arm 28 and the end of member 26 is moved so as to come in the same plane with the ends 43 of the lower bar 42 engaging therewith as shown in Fig. 13, whereby as the mechanism as a whole turns about disk 5 (referring to Figs. 1 and 13), in a clockwise direction, the opposite end of said bar is free to pass by the lip 8 on the disk 5 without engaging therewith. It will be noted that in this position the end of lug 36 bears against a cam 45 thereby moving gear 30 and pinions 31 away from the disk 5. As the pressure reduces, however, spring 28 moves the diaphragm 21 and the member 26 is moved so that it does not act as a stop for the lower bar 42 with which it has been engaged, moving instead into the plane of the upper bar. Said lower bar 42 thereupon moves to the full line position shown in Fig. 1 whereby as the mechanism turns in a clockwise direction around disk 5, said bar 42 engages with the lip 8 and causes a turning of this rotary cam member on which the bar is mounted through one-fourth of a revolution, the lug 36 dropping behind the shoulder at 46 and pins 31 entering the openings 6 in disk 5, whereupon gear 30 being held relatively stationary gear 17 is compelled to rotate and operate the pump to pump air into the tire. As the rotary member turns a quarter turn, the upper bar at one end engages with the end of member 26 which is moved so that its opposite end does not engage with the lip 8 until such time as the pressure is raised sufficiently to bring the end of member 26 again into the plane of the lower bar, this freeing the upper bar so that one end then engages the lip 8 on the disk for a quarter turn of the rotary cam member. The end 26$^a$ of member 26 having been moved into the plane of the lower bar, the rotary member is stopped with a cam 45 under lug 36, rendering the pumping mechanism inoperative until the pressure again reduces in the tire sufficient to free the end of the lower bar from the end of member 26. In describing the operations of the mechanism I have made use of the terms "upper" and "lower" in relation to the bars 42 as most clearly describing the operation, referring to Figs. 3, 5, 7, and 13 of the drawings, though in practice the mechanism is situated vertically at a side of a wheel as shown in Fig. 2.

From the foregoing it will be understood that I have provided a mechanism which automatically cuts in or out as the air pressure in a tire reduces below a predetermined amount or reaches a higher and desired amount. This mechanism is comparatively simple and works automatically without attention of the owner of the vehicle.

I claim:—

1. In combination with an automobile wheel, a housing mounted on said wheel around the hub thereof, pumping mechanism including an air pump located within the housing for pumping air against pressure, means for rendering said mechanism operative when the pressure is below a certain predetermined amount, and means for rendering said mechanism inoperative on attainment of a predetermined higher pressure, substantially as described.

2. In combination with a relatively stationary axle, a wheel mounted thereon for rotation, a cylindrical housing drum mounted on the wheel around the axle thereof, a pumping mechanism carried entirely within the housing, a device carried by the axle with which said mechanism is adapted to connect to operate the same with the rotation of the wheel, means for automatically connecting said pumping mechanism to said device when the pressure against which the pump works is below a certain amount and means for automatically disconnecting said pumping mechanism from the device upon attainment of a predetermined higher pressure.

3. In combination with a relatively stationary axle, a wheel having a hub mounted thereon for rotation, a short cylindrical housing mounted on and movable with the wheel, a disk secured to the axle within the housing, a gear loose on the hub, interengaging devices on the gear and disk, a pump mounted within the housing, mechanism interposed between the pump and gear whereby the pump is adapted to be operated on rotation of the wheel when the gear and disk are connected together, means normally tending to force the gear into connection with the disk, movable means adapted in one position to disconnect the gear and disk and occupying said position when the pressure against which the pump works is above certain amount, and means to automatically move said movable means to another position to permit engagement of the gear and disk on decrease of pressure to a certain predetermined amount.

4. In combination with a relatively stationary axle, a wheel having a hub mounted thereon for rotation, a disk having openings therein fixed on the axle, a gear loose on the hub, a member including a base fixed on the wheel, pins on the gear extending toward the disk, a pinion mounted on the base and meshing with the gear, an air pump carried on the base, means for operating the same on rotation of the pinion, and means automatically operated by the variations in pressure against which the pump works for controlling the connection of the gear and disk, said connection occurring when the pressure is below a certain amount and breaking when a certain higher pressure is attained.

5. In combination with a relatively stationary axle, a wheel having a hub rotatively mounted on the axle, a disk fixed to the axle, a gear loose on the hub, interengaging means on the gear and disk, a cylindrical housing located around the hub and attached to move with the wheel, a pump connected to one side of the housing within the same, mechanism interposed between the gear and pump for operating the pump when the gear is connected with the disk and the wheel rotated, and means automatically operated by the variations of the pressure against which the pump works for controlling the connection of the gear and disk, said connection occurring when the pressure is below a certain amount and breaking when a certain higher pressure is attained.

6. In combination with a relatively stationary axle, a wheel having a hub rotatively mounted on the axle, a disk fixed to the axle, a gear loose on the hub, interengaging means on the gear and disk, a pump, mechanism interposed between the gear and pump for operating the pump when the gear is connected with the disk and the wheel rotated, a yoke secured to and controlling the position of the gear, a lug projecting from the yoke, a rotating cam member on which the lug rests, and means for turning said cam member a partial rotation when the pressure against which the pump works reduces below a certain amount to thereby prevent the connection of the disk and gear.

7. In combination with a relatively stationary axle, a wheel having a hub rotatively mounted on the axle, a disk fixed to the axle, a lip projecting laterally from the edge of the disk, a gear loose on the hub, interengaging means on the gear and disk, a pump, mechanism interposed between the gear and pump for operating the pump when the gear is connected with the disk and the wheel rotated, a yoke pivotally mounted and attached to the gear, a rotatively mounted cam member, a lug projecting from the yoke and resting against said cam member, bars extending from and movably mounted on said cam member and adapted to engage with said lip on turning the wheel about the disk to rotate the cam member, and means for holding said bars from engaging with the lip when the pressure against which the pump works is at a predetermined amount, said means becoming ineffective when the pressure reduces below a lower predetermined amount.

8. In combination with a relatively stationary axle, a wheel having a hub rotatively mounted on the axle, a disk fixed on the axle, a lip projecting from an edge of the disk, a cam member rotatively mounted on the wheel adjacent the disk, arms movably mounted on the cam member and extending radially therefrom the end of one of said arms normally engaging with the lip on turning about the disk, a gear loosely mounted on the hub, interengaging devices on the gear and disk, a yoke connected to the gear having a part bearing against the cam member whereby in one position thereof the gear and disk are not connected and in another position they are connected, a pump, mechanism interposed between the gear and pump for operating the pump when said gear and disk are connected and the wheel rotated, a conduit leading from the pump, a housing having a flexible diaphragm against which the air pressure produced by the pump is directed, a pin extending from the diaphragm, a spring having an arm at the end of the pin resisting said air pressure and a member pivotally mounted and interposed between said spring and pin having a free end adapted on attainment of a certain pressure and depression of the diaphragm to be interposed in the path of one of said arms on the cam member and move the same so as not to engage with the lip on rotation of the wheel, said member moving out of said position into the path of the other arm on reduction of the pressure to a certain lower amount, substantially as described.

In testimony whereof I affix my signature.

WALTER DEWEY.